(43.) CALVIN T. BEEBE.　　Manufacture of Barn Forks.
No. 121,983.　　　　　　　Patented Dec. 19, 1871.
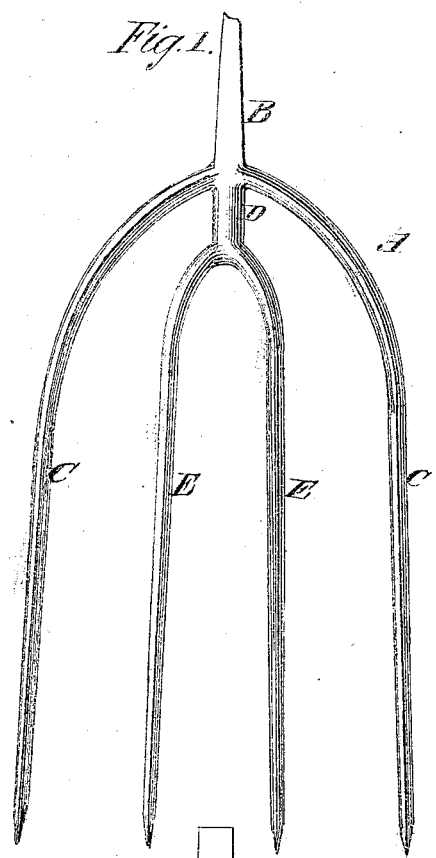
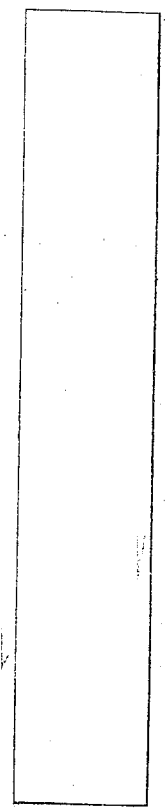
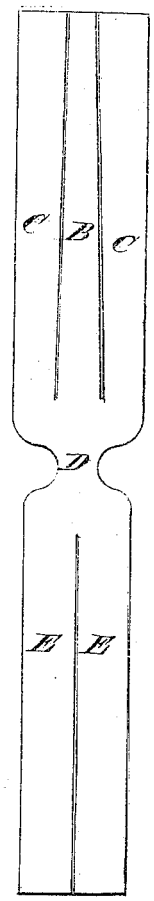
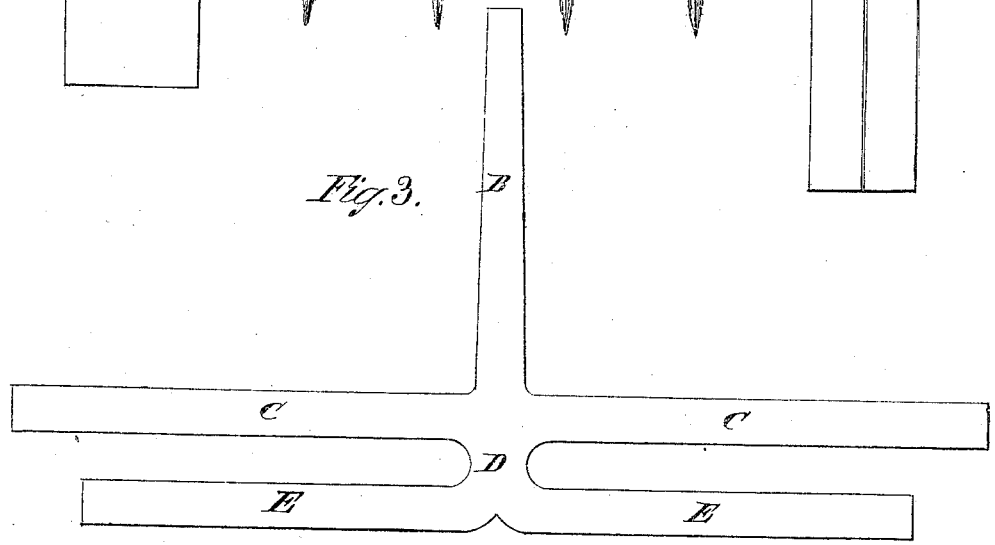
Witnesses:
John Becker.
Francis M. Ardl.
Inventor:
C. T. Beebe
per
Attorneys.

UNITED STATES PATENT OFFICE.

CALVIN T. BEEBE, OF JACKSON, MICHIGAN, ASSIGNOR OF ONE-HALF HIS RIGHT TO ELIHU COOLEY, OF SAME PLACE.

IMPROVEMENT IN THE MANUFACTURE OF BARN-FORKS.

Specification forming part of Letters Patent No. 121,983, dated December 19, 1871.

*To all whom it may concern:*

Be it known that I, CALVIN T. BEEBE, of Jackson, in the county of Jackson and State of Michigan, have invented a new and useful Improvement in Four-Tined Barn-Forks; and I do hereby declare that the following is a full, clear, and exact description thereof, which will enable others skilled in the art to make and use the same, reference being had to the accompanying drawing forming part of this specification.

The object of this invention is to produce a four-tined barn or hay-fork from a suitable piece of steel, so that the fork shall have a solid shank and the tines be arranged so as to render the barn-fork more convenient and more durable than it has hitherto been; and it consists in the construction and arrangement of parts hereinafter described.

In the accompanying drawing, Figure 1 represents the fork complete. Figs. 2 and 3 show the manner of its construction from the plain piece of steel, Fig. 4.

Similar letters of reference indicate corresponding parts.

A is the fork, consisting of the shank B, the two outer tines C C, the neck D, and the two inner tines E E.

The first operation is to form the neck D in the plain blank, Fig. 4, a little further from one end than the other, and after drawing the short end to the usual size for two-tined forks I split it for two tines; I then split the long end twice, leaving a tine on each side of the center piece, which is for the shank B. The two upper tines C C are now turned down and the inner tines E E are turned up, as seen in Fig. 3. The neck D is now twisted sufficiently to carry the lower tines from underneath the upper ones and give room for drawing all the tines their proper size.

When this operation is performed the neck is turned back and the tines are bent to their proper positions, as seen in the complete fork.

Having thus described my invention, I claim as new and desire to secure by Letters Patent—

1. The method of constructing the fork as herein described.

2. The fork constructed as described.

CALVIN T. BEEBE.

Witnesses:
WM. D. FRITTS,
C. C. BURT.

(77)